(12) United States Patent
Takeshita et al.

(10) Patent No.: US 9,312,556 B2
(45) Date of Patent: Apr. 12, 2016

(54) POLYMER ELECTROLYTE MEMBRANE, METHOD FOR PRODUCING POLYMER ELECTROLYTE MEMBRANE, AND SOLID POLYMER FUEL CELL

(75) Inventors: Shinya Takeshita, Toyota (JP); Hiroshi Suzuki, Miyoshi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 651 days.

(21) Appl. No.: 13/055,228

(22) PCT Filed: Jun. 10, 2009

(86) PCT No.: PCT/JP2009/060982
§ 371 (c)(1),
(2), (4) Date: Jan. 21, 2011

(87) PCT Pub. No.: WO2010/010763
PCT Pub. Date: Jan. 28, 2010

(65) Prior Publication Data
US 2011/0129760 A1    Jun. 2, 2011

(30) Foreign Application Priority Data
Jul. 23, 2008    (JP) .................. 2008-190211

(51) Int. Cl.
*H01M 8/10*    (2006.01)
(52) U.S. Cl.
CPC .......... *H01M 8/1048* (2013.01); *H01M 8/1072* (2013.01); *H01M 2300/0082* (2013.01); *Y02E 60/522* (2013.01); *Y02P 70/56* (2015.11)

(58) Field of Classification Search
CPC ..................................................... H01M 8/1048
USPC ............................................ 429/492; 13/492
See application file for complete search history.

(56) References Cited

U.S. PATENT DOCUMENTS

2002/0093008 A1    7/2002    Kerres et al.
2005/0238937 A1    10/2005    Oren et al.
(Continued)

FOREIGN PATENT DOCUMENTS

DE    10 2004 017 889    12/2004
JP    2001-118579    4/2001
(Continued)

OTHER PUBLICATIONS

International Search Report in International Application No. PCT/JP2009/060982; Mailing Date: Aug. 12, 2009.
(Continued)

*Primary Examiner* — Ula C Ruddock
*Assistant Examiner* — Archer Dudley
(74) *Attorney, Agent, or Firm* — Finnegan, Henderson, Farabow, Garrett & Dunner, LLP (57) ABSTRACT

A polymer electrolyte membrane having good resistance to radicals is provided. A polymer electrolyte membrane is characterized of containing organic/inorganic hybrid particles in which a surface of an inorganic particle, which is a radical scavenger, is modified with organic compounds in a polymer electrolyte. As the organic/inorganic hybrid particles in which a surface of an inorganic particle is modified with organic compounds, a radical scavenger prepared by reacting inorganic particles with organic compounds in a solvent by supercritical or subcritical hydrothermal synthesis is preferred.

6 Claims, 5 Drawing Sheets

(56) References Cited

U.S. PATENT DOCUMENTS

| | | |
|---|---|---|
| 2005/0282052 A1 | 12/2005 | Kim et al. |
| 2007/0092423 A1* | 4/2007 | Hyeon et al. ............. 423/263 |
| 2007/0099052 A1* | 5/2007 | Frey et al. ................ 429/33 |
| 2007/0213209 A1* | 9/2007 | Siddiqui et al. ........... 502/304 |
| 2009/0253001 A1 | 10/2009 | Ito |
| 2009/0280383 A1* | 11/2009 | Mackinnon et al. ........ 429/33 |

FOREIGN PATENT DOCUMENTS

| | | |
|---|---|---|
| JP | 2005-190752 | 7/2005 |
| JP | 2007-165196 | 6/2007 |
| JP | 2007-213851 | 8/2007 |

OTHER PUBLICATIONS

International Preliminary Report on Patentability in International Application No. PCT/JP2009/060982; Completion Date: Jun. 8, 2010.

Applicant's Reply in International Application No. PCT/JP2009/060982; Notification Date: Aug. 12, 2009.

German Office Action for Appl. No. 11 2009 001 621.9 dated Feb. 8, 2012.

* cited by examiner

POLYMER ELECTROLYTE MEMBRANE, METHOD FOR PRODUCING POLYMER ELECTROLYTE MEMBRANE, AND SOLID POLYMER FUEL CELL

CROSS-REFERENCE TO RELATED APPLICATIONS

This application is a national phase application of International Application No. PCT/JP2009/060982, filed Jun. 10, 2009, and claims the priority of Japanese Application No. 2008-190211, filed Jul. 23, 2008, the contents of both of which are incorporated herein by reference.

TECHNICAL FIELD

The present invention relates to a polymer electrolyte membrane having good chemical durability and a method for producing the polymer electrolyte membrane. The present invention further relates to a solid polymer fuel cell comprising such a polymer electrolyte membrane.

BACKGROUND ART

A solid polymer electrolyte fuel cell has a structure comprising a solid polymer electrolyte membrane as an electrolyte and catalyst electrode layers bonded to both sides of this membrane. Such solid electrolyte membrane and catalyst electrode layers composing the solid polymer electrolyte fuel cell are generally formed using polymer electrolyte materials having proton conductivity. As such electrolyte materials, perfluorosulfonic acid-based resins such as Nafion (trademark: DuPont) have been widely used.

Meanwhile, fluoride-based and hydrocarbon-based electrolyte membranes that are used for solid polymer fuel cells become thinner when electrolyte polymers deteriorate due to OH radicals generated upon electric power generation. A means for suppressing such deterioration involves adding a radical scavenger such as $CeO_2$ to a catalyst layer or a diffusion layer of a membrane electrode assembly (MEA), so as to improve the resistance of MEA to radicals. In this case, the radical scavenger added to the catalyst layer or the diffusion layer migrates into the membrane with time.

For example, the following JP Patent Publication (Kokai) No. 2007-213851 A discloses that, for the purpose of improving the durability of a polymer electrolyte membrane, a hydrogen peroxide decomposing agent, a radical scavenger, or an antioxidant is preferably contained in a diffusion layer.

Aside from this, there are methods that involve directly adding a radical scavenger to an electrolyte membrane. Methods for directly adding a radical scavenger to an electrolyte membrane are broadly classified into methods that involve adding it after membrane production via an ion exchange method or the like and methods that involve mixing an electrolyte polymer with a radical scavenger before membrane production. Particularly when a solid such as an oxide is added, the latter methods are desirable. Furthermore, when membrane production is carried out by casting, a radical scavenger is added to and mixed with a cast liquid in advance for casting. When membrane production is carried out by melt-molding, an $-SO_2F$ type polymer, which has a precursor structure of an electrolyte, is mixed with a radical scavenger and then hydrolysis is carried out after melting and membrane production, thereby converting the polymer to an $-SO_3H$ type polymer that can undergo proton conduction.

In the case of a membrane production method via melting, membrane hydrolysis is carried out after addition of a scavenger. In the case of a radical scavenger such as $CeO_2$ or $Ag_2O$, which is relatively easily dissolved in acid, there is a problem that during acid treatment, partial or the entire volume of such a radical scavenger in the membrane is dissolved and then flows out from the membrane, so that the radical scavenger that should already be added upon completion of the electrolyte membrane is lost during membrane preparation. As a result, a problem that sufficient resistance to radicals cannot be imparted to the membrane also occurs.

A radical scavenger is thought to deactivate radicals by itself or in the form of cation thereof generated as a result of dissolution thereof. Dissolution of a radical scavenger itself is not a problem. Actually, the interior of an electrolyte membrane is acidic atmosphere. It is thought that during operation of a cell, acidic water is also present within the membrane because of external humidifying water or generated water and a radical scavenger is eluted thereinto to generate cations and thus to deactivate radicals. A problem is that a radical scavenger expected to be eluted and act during operation of a cell is eluted during membrane preparation because of its exposure to acid, so that the scavenger is partially or completely lost. Therefore, it has been an issue to find a method that involves suppressing elution of a radical scavenger due to acid in a hydrolysis step, so as to enable sufficient exertion of the functions of the radical scavenger with no problems during operation of a cell, although the radical scavenger in the membrane is exposed to acidic atmosphere in both the membrane hydrolysis step and the operation of a cell.

DISCLOSURE OF THE INVENTION

The present invention has been completed in view of the above problems of the conventional techniques. An object of the present invention is to provide a polymer electrolyte membrane having good resistance to radicals (chemical durability) and a method for producing thereof. Accordingly, a further object of the present invention is to improve the durability of a solid polymer fuel cell.

Means to Achieve the Objects

The present inventors have discovered a method that comprises uniformly and highly dispersing a radical scavenger by a specific means in a polymer electrolyte, so as to achieve the present invention.

Specifically, first, the present invention relates to a polymer electrolyte membrane, which is characterized of containing in a polymer electrolyte organic/inorganic hybrid particles in which a surface of an inorganic particle, which is a radical scavenger, is modified with organic compounds.

A radical scavenger is highly dispersed in the polymer electrolyte membrane of the present invention without aggregating, compared to a case in which a radical scavenger is simply mixed and dispersed therein. Thus, the polymer electrolyte membrane of the present invention makes it possible to maximize the exertion of the functions of the radical scavenger. In the present invention, because of the surface organic compounds, the radical scavenger is highly miscible in the polymer electrolyte composing the matrix so as to make it possible to highly disperse the radical scavenger in the polymer electrolyte without causing aggregation thereof.

As inorganic particles used in the present invention, metal oxide particles having mean particle sizes of 1 μm or less are preferred and metal oxide particles having mean particle sizes of 100 nm or less are more preferred. Specifically, preferable examples thereof include $CeO_2$ and $Ag_2O$ particles.

Also, the addition of a radical scavenger to a polymer electrolyte membrane improves chemical durability. However, there is a problem that some radical scavengers such as a Ce compound and a Ag compound are dissolved to flow outside the polymer electrolyte membrane when sulfuric acid treatment is carried out to protonate the polymer electrolyte membrane and thus the radical scavengers that should be added upon completion of the polymer electrolyte membrane are lost during preparation of the polymer electrolyte membrane. Coating of a surface of a radical scavenger with organic compounds as in the present invention prevents the elution of the radical scavenger during acid treatment. In this case, the organic compounds themselves have, as sacrificial agents, an effect of suppressing the degradation of the polymer electrolyte membrane, so as to suppress the degradation of the polymer electrolyte membrane together with the radical scavenger during electric power generation.

Examples of the role of organic compounds composing an organic/inorganic hybrid particle used in the present invention include isolating a radical scavenger from a polymer electrolyte layer, having in a modified form high affinity for a polymer electrolyte or an organic solvent during production, and thus being miscible with them. Specifically, examples of such organic compounds preferably include one or more organic compounds selected from the group consisting of C3-20 and preferably C5-10 fluorocarbon-based or hydrocarbon-based alcohol, aldehyde, carboxylic acid, amine, thiol, amide, ketone, oxime, acid chloride, enamine, amino acid, peptide, and sugar. Such organic compounds may be firmly fixed to such surface of a metal oxide via a chemical bond selected from the group consisting of an ether linkage, an ester linkage, an N atom-mediated bond, an S atom-mediated bond, a metal-C— bond, a metal-C= bond, and a metal-(C=O)— bond.

Through the control of the types and chain lengths of surface organic compound, a radical scavenger becomes intertwined with and assimilated into the molecular chains of a polymer electrolyte, so as to enable immobilization of the radical scavenger within the polymer electrolyte and suppress the outflow of the radical scavenger during operation.

Organic/inorganic hybrid particles used in the present invention preferably have various functional groups on their organic compounds, so as to achieve the higher strength of the polymer electrolyte. Specifically, functional groups such as amide groups are used at the external ends of the surface organic compounds, so that the organic compounds are cross-linked to the functional groups the molecular chains of a polymer electrolyte and thus the strength of the polymer electrolyte can be enhanced.

As a polymer electrolyte composing the polymer electrolyte membrane matrix of the present invention, a polymer electrolyte already having proton conductivity may be used as a starting material. Alternatively, a polymer electrolyte precursor that exerts proton conductivity as a result of post-process alkaline hydrolysis and acid treatment may be used as a starting material. In this case, the polymer electrolyte precursor is subjected to post-process alkaline hydrolysis and acid treatment, and then the resultant may be used as a polymer electrolyte.

Examples of organic/inorganic hybrid particles used in the present invention in which a surface of an inorganic particle is modified with organic compounds, include hybrid particles prepared by reacting an inorganic particle with organic compounds in a solvent by supercritical or subcritical hydrothermal synthesis and those prepared by causing the organic compounds to adsorb to such surface of an inorganic particle via electrostatic attraction.

Second, the present invention relates to a method for producing a polymer electrolyte membrane, which is characterized of comprising mixing and dispersing organic/inorganic hybrid particles, in which a surface of an inorganic particle, which is a radical scavenger, is modified with organic compounds, in a polymer electrolyte or a polymer electrolyte precursor that exerts proton conductivity by alkaline hydrolysis and acid treatment and then producing a membrane.

As described above, in the method for producing a polymer electrolyte membrane of the present invention: as the above inorganic particles, metal oxide particles having mean particle sizes of 1 μm or less are preferred; as the above organic compounds, one or more organic compounds selected from the group consisting of C3-20 fluorocarbon-based or hydrocarbon-based alcohol, aldehyde, carboxylic acid, amine, thiol, amide, ketone, oxime, acid chloride, enamine, amino acid, peptide, and sugar are preferred; preferably the organic compounds are further having functional groups; a preferable example of the polymer electrolyte is a polymer electrolyte prepared by alkaline hydrolysis and acid treatment of a polymer electrolyte precursor that exerts proton conductivity by alkaline hydrolysis and acid treatment; a preferred example of the organic/inorganic hybrid particles in which a surface of an inorganic particle is modified with organic compounds are prepared by reacting such inorganic particle with organic compounds in a solvent by supercritical or subcritical hydrothermal synthesis.

Third, the present invention relates to a solid polymer fuel cell having the above polymer electrolyte membrane.

Effect of the Invention

The polymer electrolyte membrane of the present invention exerts actions and effects such that: (1) a radical scavenger can be more finely and uniformly dispersed in a polymer electrolyte compared to conventional techniques, so that improvement in moldability, quality improvement, and stable resistance to radicals can be ensured; (2) a radical scavenger can be immobilized in a polymer electrolyte, making it possible to suppress migration and dissociation of the radical scavenger in a polymer electrolyte, to ensure stable resistance to radicals, and to realize longer life span; (3) higher strength of the polymer electrolyte membrane suppresses the occurrence of creeps and cracks therein and mechanical membrane degradation such as cracks and tears resulting from such creeps and cracks. Therefore, the power generation performance and durability of a solid polymer electrolyte fuel cell can be improved.

BEST MODE FOR CARRYING OUT THE INVENTION

Figure 1:
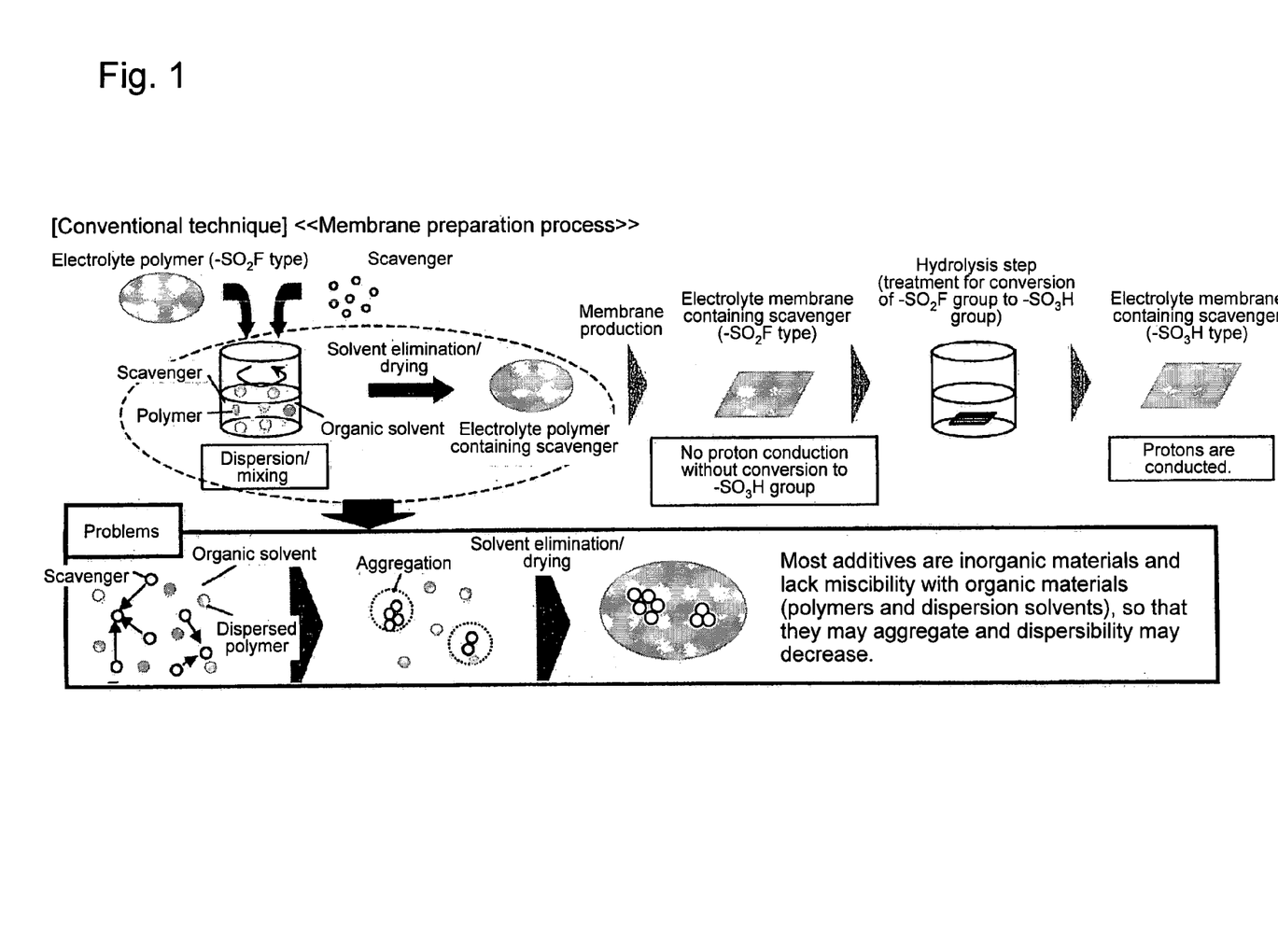
FIG. 1 shows the conventional processes for producing polymer electrolyte membranes.

FIG. 1 shows the conventional processes for producing polymer electrolyte membranes. A polymer electrolyte precursor (—$SO_2F$ type) and a radical scavenger are dispersed and mixed in an organic solvent, followed by solvent elimination and drying. The radical scavenger-mixed polymer electrolyte thus obtained is subjected to membrane production. Conventional processes for producing an electrolyte membrane; that is, an electrolyte membrane containing a radical scavenger, are shown. A polymer electrolyte precursor is subjected to the hydrolysis step so that an —$SO_2F$ group is converted to an —S $SO_3H$ group. Most of radical scavengers in the resulted radical scavenger-containing polymer electrolyte membrane (—$SO_3H$ type) are inorganic materials. Because of poor miscibility with the polymer electrolyte that is an organic material and the dispersion solvent used for production, such radical scavengers may aggregate and dispersibility may decrease.

Figure 2:
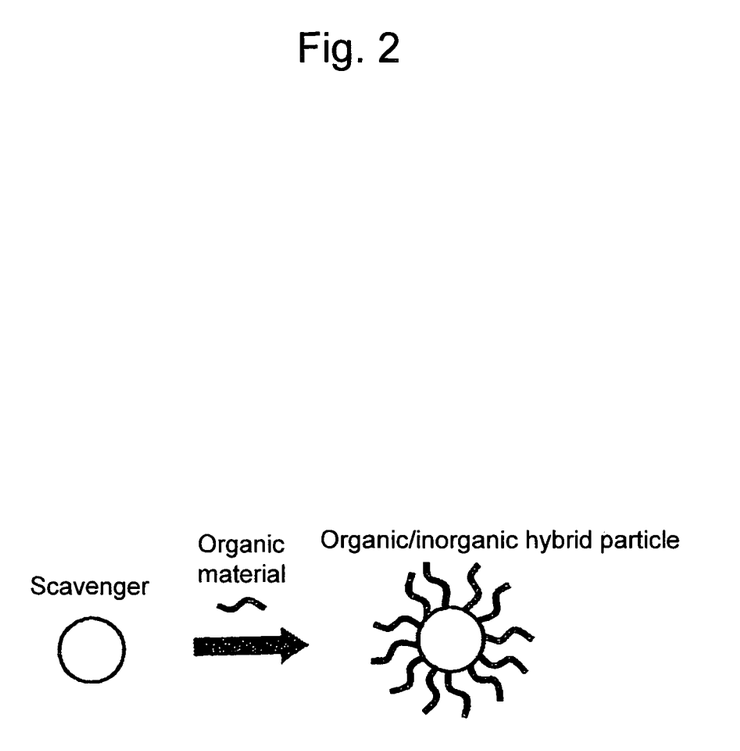
FIG. 2 is a schematic view showing an organic/inorganic hybrid particle used in the present invention, in which the surface of an inorganic particle is modified with organic compounds.

FIG. 2 is a schematic view showing organic/inorganic hybrid particles used in the present invention, in which a surface of an inorganic particle is modified with organic compounds. Organic compounds are bound or adsorb to the surface of a radical scavenger such as $CeO_2$ and $AgO_2$. Coating of the surface of a radical scavenger with organic compounds enables suppression of aggregation and high dispersion.

Figure 3:
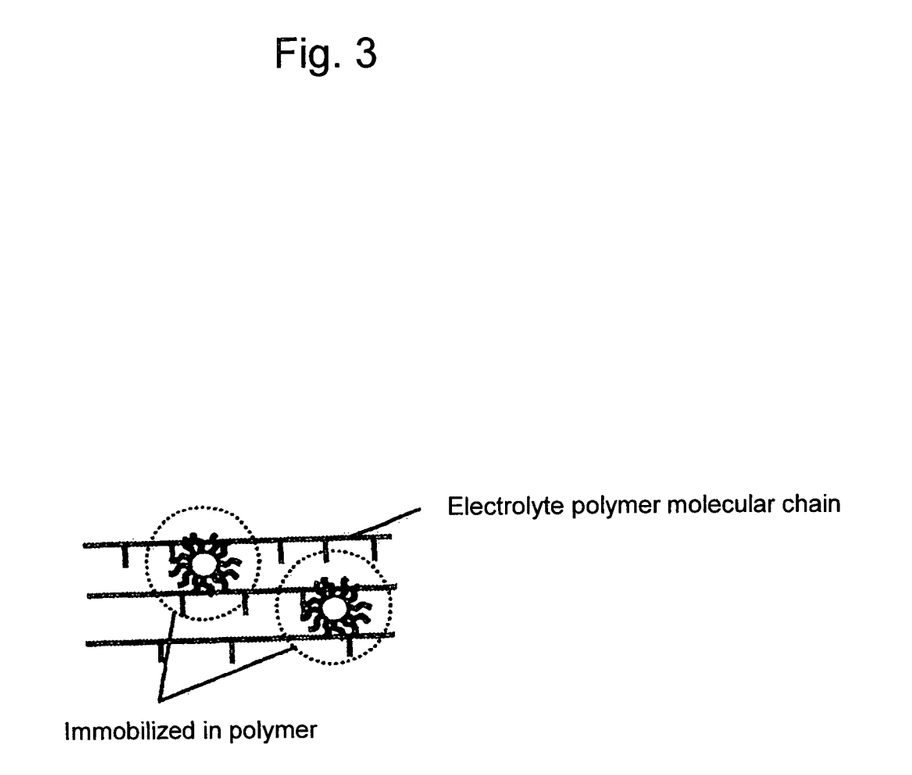
FIG. 3 shows how a radical scavenger is intertwined with and assimilated into molecular chains of a polymer electrolyte and thus the radical scavenger is immobilized within the polymer electrolyte.

Also, through the control of the types and chain lengths of surface organic compound as shown in FIG. 3, a radical scavenger becomes intertwined with and assimilated into the molecular chains of the polymer electrolyte, so as to enable immobilization of the radical scavenger within the polymer electrolyte and suppress the outflow of the radical scavenger during operation.

Figure 4:
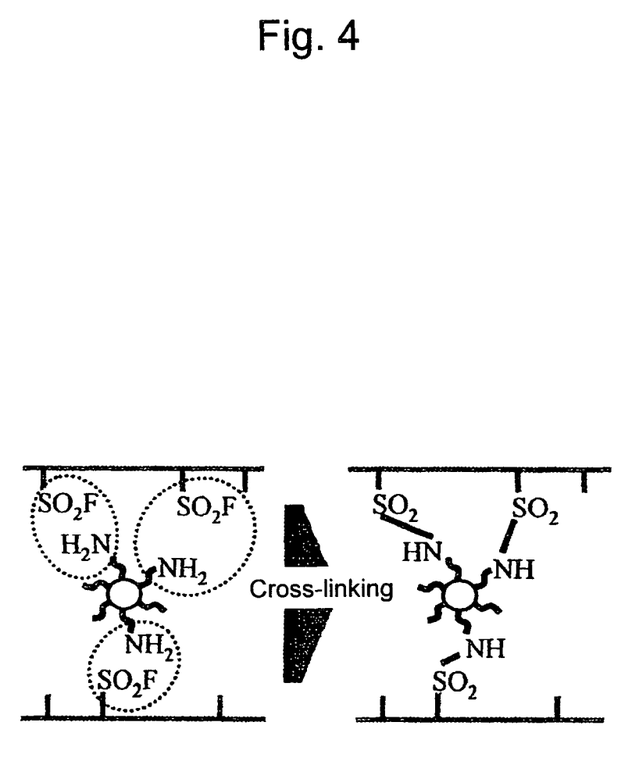
FIG. 4 shows that the functional groups used at the external ends of surface organic compounds are cross-linked to functional groups of the molecular chains of a polymer electrolyte.

Furthermore, as shown in FIG. 4, functional groups such as amide groups are used at the external ends of the surface organic compounds, so that the organic compounds are cross-linked to the functional groups of the molecular chains of a polymer electrolyte and thus the strength of the polymer electrolyte can be enhanced.

It is further shown that surface organic compounds are removed by radicals, so that the effects of the radical scavenger are effectively exerted. Modification with organic compounds that are chemically weaker than a fluorinated backbone of an electrolyte polymer causes radicals to preferentially attack the organic compounds, and then the radicals are inactivated. As a result, the polymer electrolyte is protected. As the degradation of surface organic compounds proceeds, a radical scavenger appears and exerts the original effect of resistance to radicals, so as to protect the polymer electrolyte.

A polymer electrolyte (H-type polymer electrolyte) having proton conductivity used in the present invention has sulfonic acid groups and the like, and has its own proton conductivity even without denaturation thereof in the post-process. On the other hand, a polymer electrolyte precursor (F-type polymer electrolyte), which is similarly preferably used in the present invention and exerts proton conductivity by alkaline hydrolysis and acid treatment, has precursor groups such as an —$SO_2F$ group and an —$SO_2Cl$ group that are converted to proton conductive groups such as a sulfonic acid group via hydrolysis and conversion into an acid form in the post process.

In the present invention, a polymer electrolyte membrane may be used as a single membrane or may also be used as a composite polymer electrolyte membrane in view of strength and durability, which is prepared by combining a porous membrane with a polymer electrolyte membrane. A method for producing such a composite polymer electrolyte membrane by combining a porous membrane with a polymer electrolyte is not particularly limited and various known methods can be employed herein. When the composite polymer electrolyte membrane is used, the thickness of the solid polymer electrolyte membrane can be reduced. Moreover, a polymer film or a polymer sheet substrate can be used as a support of an electrolyte membrane, so that the strength of the electrolyte membrane can be reinforced. Thus, the fuel cell provided with the composite solid polymer electrolyte membrane is highly durable and can have a reduced cross-leak of fuel gas and improved current-voltage characteristics.

Hereafter, organic/inorganic hybrid particles used in the present invention, in which a surface of an inorganic particle is modified with organic compounds, are explained.

Regarding fine particles, particularly, nanoparticles, whose usefulness is expected because of their various useful properties and functions, many methods for synthesis including supercritical synthesis have been proposed and developed. However, a method for recovering the resulted very fine particles or nanoparticles and a method for keeping fine particles dispersed and stabilized without causing the aggregation thereof even after recovery have been required. In addition, when such particles are used, there is a need to disperse them well in a resin, plastics, or a solvent. In particular, nanoparticles and the like that are synthesized in water have often hydrophilic surfaces, so that they cannot be easily recovered from water. There is also a problem that such nanoparticles and the like they have poor miscibility with organic solvents, resins, and the like.

To satisfy these needs, the surfaces of nanoparticles should be modified with organic substances according to each purpose. Examples of desirable modification include modification with a polymer similar to a resin and modification via provision of the same functional group as that of a solvent. If surface modification can be carried out in water, separation and recovery of nanoparticles from water are facilitated. For surface modification of nanoparticles synthesized in water with organic substances, water and organic substances are desirably in a homogenous phase. However, modifiers that can be used in this case are limited to amphiphilic surfactants or lower alcohol and the like that are also soluble in water. Furthermore, if recovered by some kind of method, the recovered nanoparticles may aggregate extremely easily. Nanoparticles that have once aggregated cannot be easily dispersed again even when a dispersing agent is used: In addition, surface modification of such nanoparticles is completely difficult.

Examples of "metal" in a metal oxide contained in a metal oxide fine particle, which is preferably used in the present invention as an inorganic particle in an organic/inorganic hybrid particle in which a surface of an inorganic particle is modified with organic compounds include: elements of the family VIII such as Fe, Co, Ni, Ru, Rh, Pd, Os, Ir, and Pt; elements of the family IB such as Cu, Ag, and Au; elements of the family IIB such as Zn, Cd, and Hg; elements of the family IIIB such as B, Al, Ga, In, and Tl; elements of the family IVB such as Si, Ge, Sn, and Pb; elements of the family VB such as As, Sb, and Bi; elements of the family VIB such as Te and Po; and elements of the families IA to VIIA such as Ce. Examples of metal oxides include oxides of Fe, Co, Ni, Cu, Ag, Au, Zn, Cd, Hg, Al, Ga, In, Tl, Si, Ge, Sn, Pb, Ti, Zr, Mn, Eu, Y, Nb, Ce, Ba, and the like. Further examples of oxides include $SiO_2$, $TiO_2$, $ZnO_2$, $SnO_2$, $Al_2O_3$, $MnO_2$, NiO, $Eu_2O_3$, $Y_2O_3$, $Nb_2O_3$, InO, ZnO, $Fe_2O_3$, $Fe_3O_4$, $CO_3O_4$, $ZrO_2$, $CeO_2$, $BaO.6Fe_2O_3$, $Al_5(Y+Tb)_3O_{12}$, $BaTiO_3$, $LiCoO_2$, $LiMn_2O_4$, $K_2O.6TiO_2$, and AlOOH.

Organic compounds used herein are not particularly limited, as long as they can bind to fluorocarbon, hydrocarbon, or the like onto the surfaces of fine particles or cause adsorption thereof onto the same. Examples of organic compounds include organic compounds that allow the formation of strong bonds such as an ether linkage, an ester linkage, an N-atom-mediated bond, an S-atom-mediated bond, a metal-C— bond, a metal-C= bond, and a metal-(C=O)— bond.

A long-chain fluorocarbon or a long-chain hydrocarbon having a chain with a carbon number of 3 or more is preferred. Examples thereof include C3-20 linear, branched, or cyclic fluorocarbon and hydrocarbon. They may be substituted or unsubstituted fluorocarbon and hydrocarbon.

Examples of organic compounds include alcohols, aldehydes, ketones, carboxylic acids, esters, amines, thiols, amides, ketones, oximes, acid chlorides, enamines, amino acids, peptides, and sugars.

Examples of typical organic compounds include pentanol, pentanal, pentanoic acid, pentanamide, pentanethiol, hexanol, hexanal, hexanoic acid, hexanamide, hexanethiol, heptanol, heptanal, heptanoic acid, heptanamide, heptanethiol, octanol, octanal, octanoic acid, octanamide, octanethiol, decanol, decanal, decanoic acid, decanamide, decanethiol, and fluorides thereof.

Examples of a hydrocarbon group include a linear or branched alkyl group that may be substituted, a cyclic alkyl group that may be substituted, an aryl group that may be substituted, an aralkyl group that may be substituted, and a saturated or unsaturated heterocyclic group that may be substituted. Examples of a substituent include a carboxy group, a cyano group, a nitro group, a halogen, an ester group, an amide group, a ketone group, a formyl group, an ether group, a hydroxy group, a nitro group, an amino group, a sulfonyl group, —O—, —NH—, and —S—.

Examples of the present invention are as described below.

Example 1

$CeO_2$ sol (mean particle size of 20 nm) was reacted with decanoic acid ($CH_3(CH_2)_8COOH$) under high temperature and high pressure by hydrothermal synthesis. Thus, $CeO_2$ powders were prepared, in which the surface was modified with the organic compounds.

The resultants were dispersed in and mixed with a Nafion fluorine-based polymer (—$SO_2F$ type) in an organic solvent. Subsequently, the solvent was removed and then a film with a thickness of 30 μM was prepared by melt-molding (polymer precursor 1). The resultant was hydrolyzed with 1 N NaOH/DMSO and 1 N sulfuric acid, so that an electrolyte membrane was obtained (polymer electrolyte membrane 1).

Example 2

$CeO_2$ sol (mean particle size of 20 nm) was reacted with perfluorooctanoic acid (PFOA; $C_7F_5COOH$) under high temperature and high pressure by hydrothermal synthesis. Thus, $CeO_2$ powders were prepared, in which the surface was modified with the organic compound.

The resultants were dispersed in and mixed with a Nafion fluorine-based polymer (—$SO_2F$ type) in an organic solvent. Subsequently, the solvent was removed and then a film with a thickness of 30 μm was prepared by melt molding (polymer precursor 2). The resultant was hydrolyzed with 1 N NaOH/DMSO and 1 N sulfuric acid, so that an electrolyte membrane was obtained (polymer electrolyte membrane 2).

Example 3

$CeO_2$ sol (mean particle size of 20 nm) was reacted with ε-caprolactam ($C_6H_{11}NO$) under high temperature and high pressure by hydrothermal synthesis. Thus, $CeO_2$ powders were prepared, in which the surface was modified with the organic compound.

The resultants were dispersed in and mixed with a Nafion fluorine-based polymer (—$SO_2F$ type) in an organic solvent. Subsequently, the solvent was removed and then a film with a thickness of 30 μm was prepared by melt-molding (polymer precursor 3). The resultant was hydrolyzed with 1 N NaOH/DMSO and 1 N sulfuric acid, so that an electrolyte membrane was obtained (polymer electrolyte membrane 3).

Comparative Example 1

$CeO_2$ sol (mean particle size of 20 nm) and a Nafion fluorine-based polymer (—$SO_2F$ type) were dispersed and mixed in an organic solvent. Subsequently, the solvent was removed and then a film with a thickness of 30 μm was prepared by melt-molding (polymer precursor 4). The resultant was hydrolyzed with 1 N NaOH/DMSO and 1 N sulfuric acid, so that an electrolyte membrane was obtained (polymer electrolyte membrane 4).

Comparative Example 2

A Nafion fluorine-based polymer (—$SO_2F$ type) was subjected to melt-molding without adding anything, so that a film with a thickness of 30 μm was prepared. The resultant was hydrolyzed with 1 N NaOH/DMSO and 1 N sulfuric acid, so that an electrolyte membrane was obtained (polymer electrolyte membrane 5).

Catalyst layers were transferred to the polymer electrolyte membranes 1 to 5 and then carbon paper was used as diffusion layers, so that MEAs were prepared. (MEAs 1 to 5).

[Evaluation of Dispersibility]

The cross sections of the polymer precursor 1 and the polymer precursor 4 were observed under an electron microscope and compared in terms of the dispersibility of the radical scavengers in the polymer electrolytes. In the case of polymer precursor 1, no aggregates were observed and the sizes of all the particles were each 100 nm or less, while, in the case of the polymer precursor 4, $CeO_2$ aggregates with maximum sizes ranging from 2 to 3 μm were observed.

[Comparison of Strength by Tensile Test]

Figure 5:
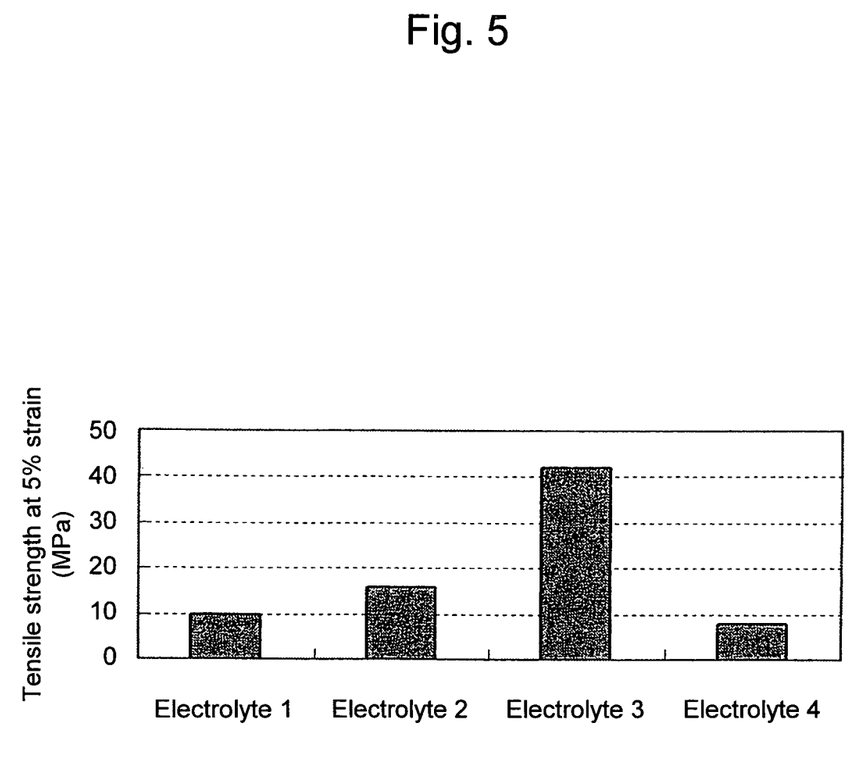
FIG. 5 shows the results of a tensile test conducted for polymer electrolyte membranes containing a radical scavenger.

The polymer electrolyte membranes 1 to 4 were compared for their strength in a tensile test. FIG. 5 shows the results of the tensile test conducted for the radical scavenger-containing polymer electrolyte membranes. As shown in FIG. 5, the polymer electrolyte membranes 1 to 3 of the Examples of the present invention were superior to the polymer electrolyte membrane 4 in terms of tensile strength.

[Evaluation of Durability Test]

The MEAs 1 to 5 were compared in a durability test (0.1 $A/cm^2$ ⇔ OC durability). Table 1 below shows the results of the durability test conducted for the MEAs 1 to 5.

TABLE 1

|       | Initial output voltage (V) | Output voltage (V) after 1000 hours | Output voltage (V) after 5000 hours |
|-------|---------------------------|-------------------------------------|-------------------------------------|
| MEA (1) | 0.80 | 0.79 | 0.76 |
| MEA (2) | 0.81 | 0.75 | 0.74 |
| MEA (3) | 0.80 | 0.78 | 0.74 |
| MEA (4) | 0.79 | 0.77 | 0.61 |
| MEA (5) | 0.82 | 0.45 | —    |

It was understood that in the MEAs 1 to 3 of the Examples of the present invention, almost no decrease was observed in both the output voltage after 1000 hours and the output voltage after 5000 hours.

[Evaluation of Elution of $CeO_2$ Due to Acid Treatment]

The solutions of the polymer electrolyte membrane 1 and the polymer electrolyte membrane 4 treated with acid were recovered and then the percentages of $CeO_2$ eluted with respect to the amounts added were compared by ICP measurement. The result was 0.01% in the case of the polymer electrolyte membrane 1, while the percentage of $CeO_2$ eluted in the case of the polymer electrolyte membrane 4 was as high as 34%. Therefore, the effect of the organic compounds in preventing the elution of the radical scavengers was proved.

INDUSTRIAL APPLICABILITY

According to the present invention, a radical scavenger in a polymer electrolyte membrane can be highly dispersed and resistance to radicals can be ensured. Therefore, the power generation performance and durability of a solid polymer electrolyte fuel cell can be improved.

The invention claimed is:

1. A polymer electrolyte membrane containing, in a polymer electrolyte, organic/inorganic hybrid particles in which a surface of an inorganic particle, which is a radical scavenger, is modified with one or more organic compounds selected from C3-20 fluorocarbon-based carboxylic acid.

2. The polymer electrolyte membrane according to claim 1, wherein the inorganic particle is a metal oxide particle having a mean particle size of 1 μm or less.

3. The polymer electrolyte membrane according to claim 1, wherein the organic compounds bind to the surface of the inorganic particle via a bond selected from the group consisting of an ether linkage, an ester linkage, an N-atom-mediated bond, an S atom-mediated bond, a metal-C— bond, a metal-C═ bond, and a metal-(C═O)— bond.

4. The polymer electrolyte membrane according to claim 1, wherein the organic compounds in the organic/inorganic hybrid particles in which the surface of the inorganic particle is modified with the organic compounds are further having functional groups.

5. The polymer electrolyte membrane according to claim 1, wherein the polymer electrolyte is prepared by alkaline hydrolysis and acid treatment of a polymer electrolyte precursor that exerts proton conductivity by alkaline hydrolysis and acid treatment.

6. A solid polymer fuel cell comprising the polymer electrolyte membrane according to claim 1.

* * * * *